United States Patent [19]

Post

[11] Patent Number: 4,942,687

[45] Date of Patent: Jul. 24, 1990

[54] ICE FISHING MECHANISM

[76] Inventor: Joseph Post, 5 Rodgers Ave., Billerica, Mass. 01821

[21] Appl. No.: 401,007

[22] Filed: Aug. 31, 1989

Related U.S. Application Data

[63] Continuation-in-part of Ser. No. 254,044, Oct. 6, 1988, abandoned.

[51] Int. Cl.$^5$ ............................................. A01K 93/00
[52] U.S. Cl. .......................................................... 43/17
[58] Field of Search ...................................... 43/16, 17

[56] References Cited

U.S. PATENT DOCUMENTS

| | | | |
|---|---|---|---|
| 2,693,046 | 11/1954 | Langevin | 43/17 |
| 3,645,029 | 2/1972 | Roemer | 43/17 |
| 3,984,935 | 10/1976 | Petersen | 43/17 |
| 4,285,154 | 8/1981 | Grahl | 43/17 |
| 4,565,024 | 1/1986 | Maers | 43/17 |
| 4,566,216 | 1/1986 | Randall | 43/17 |
| 4,667,432 | 5/1987 | Torgrimson | 43/17 |

Primary Examiner—Kurt Rowan
Attorney, Agent, or Firm—Wolf, Greenfield & Sacks

[57] ABSTRACT

An ice-fishing rig with a signaling device which is magnetically restrained until released by movement of the fishing reel. A pair of magnetically interactive and aligned components, secured one each to the signaling device and reel, restrain the signaling device until a fish pulls on the line and the magnetic alignment is broken, releasing the signaling device. The signaling device comprises a colored float in as transparent vertical tube which is pivotally secured to the center of crossbar member. The tube is filled with an antifreeze to permit movement of the float in cold weather. The tube is pivoted to a position essentially parallel to the crossbar members for easy storage and handling.

12 Claims, 3 Drawing Sheets

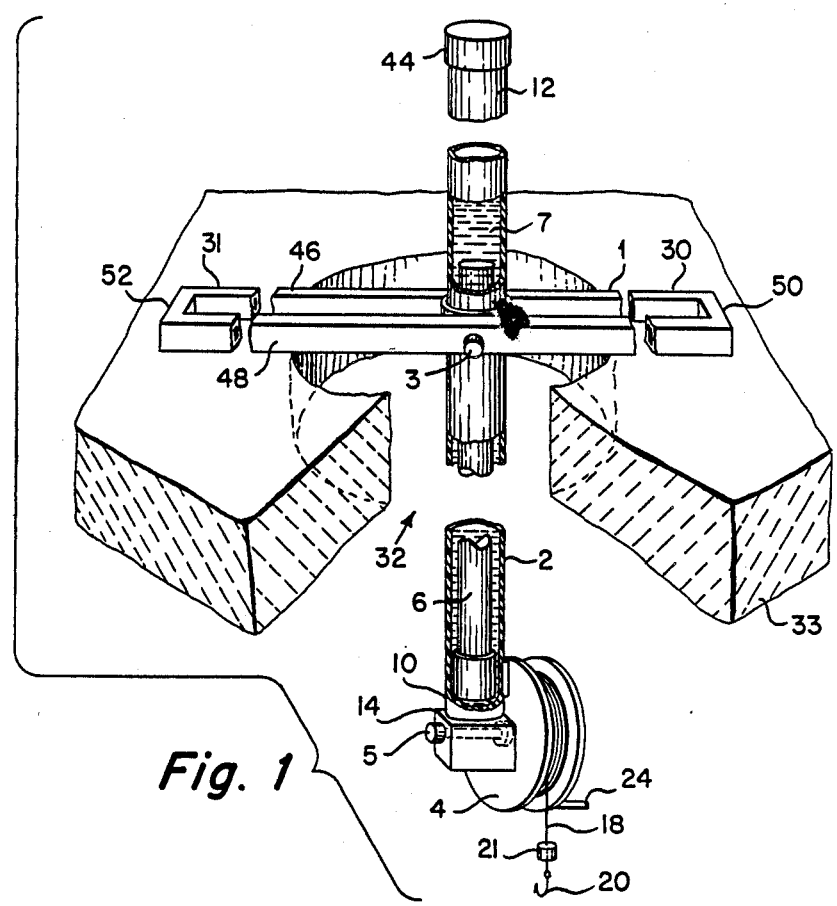
Fig. 1
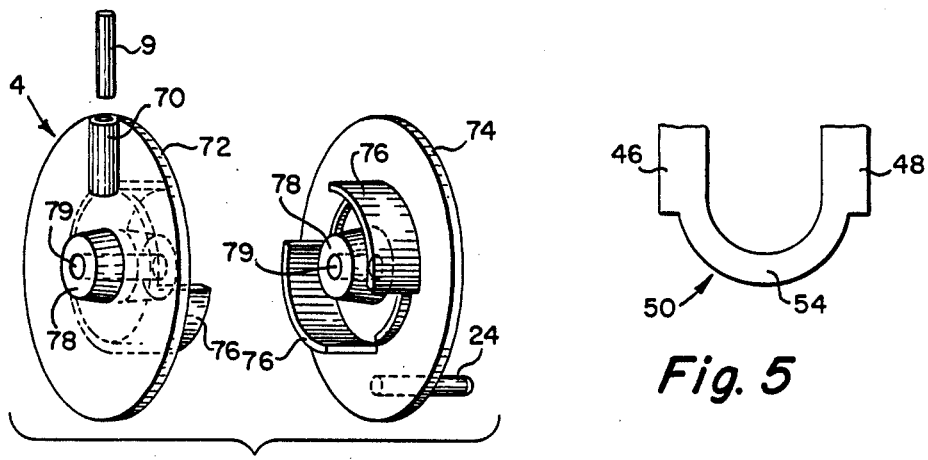
Fig. 4
Fig. 5

ICE FISHING MECHANISM

RELATED APPLICATIONS

This application is a continuation in part of U.S. patent application Ser. No. 07/254,044 filed Oct. 6, 1988, now abandoned.

BACKGROUND OF INVENTION

This sport of ice fishing has commonly used a wide variety of fishing rigs which do not need constant attention in order to permit ice fisherman to watch their fishing rigs from the comfort of ice shelters some distance from the rigs. In general, these fishing rigs provide a signal which is activated when a fish strikes the line and causes the fishing reel to rotate. A variety of systems have been developed that permit a flag or some other signal to be displayed when a fish strikes. The most pertinent art known to the applicant include U.S. Pat. Nos. 4,566,216; 3,645,029; 3,641,693; 4,285,154; 4,030,223; 4,021,958; 3,888,035; and 4,120,111. Of these, perhaps the most relevant to the present invention are U.S. Pat. Nos. 3,645,029 and 4,566,216. U.S. Pat. No. 4,566,216 generally discloses an ice fishing rig in which a signal is positioned within a tubular pole with the signal normally covered by a screen. The screen is released and falls by the force of gravity through a leverage system activated when the fish strikes the line. U.S. Pat. No. 3,645,029, on the other hand, describes an ice fishing rig in which a signal is raised under the force of mechanical spring mechanisms that are released when a fish strikes the line. Both of these rigs rely upon a mechanical actuation of the signaling devices. In the first, a leverage system is operable only under the force of a fish pulling the line. The second system is dependent upon the force of the pull by the fish and is severely limited by ambient problems and conditions of freezing. For example, the rotating and movable components may freeze, thus making the system entirely inoperable. The second reference, U.S. Pat. No. 3,645,029, has similar mechanical movement limitations. In that system, the restraining means, comprising magnetic components, must be stronger than the spring mechanism which propels the signal upwardly. In addition, freezing water inside the tube may make the system inoperable. Serious limitations also exist in respect to the strengths of the magnet and the relationship of the spring mechanism.

SUMMARY OF THE INVENTION

The purpose of this invention is to provide an improved ice fishing rig that avoids deficiencies existent in currently available rigs. More specifically, the present invention is intended to provide an ice fishing rig in which the operable components are not likely to freeze during use and will, accordingly, operate with certainty at all times.

A further object of the present invention is to provide an ice fishing rig which is light in weight, simple in construction, easy to repair, simple to use, and inexpensive to manufacture.

A further object of this invention is to provide an ice fishing rig in which the signaling component comprises a colored or distinctive float that is moved to a signaling position without the requirement of mechanical actuation.

A further object of this invention is to provide an ice fishing rig in which the signaling device may be readily reset to its initial position without adjustment of mechanical devices and by merely rotating a single component.

One further object of the present invention is to provide an ice fishing rig in which the signaling device is contained within a tubular structure and is not exposed to ambient conditions and in particular, may not be affected by winds, rain, or other weather conditions.

Another object of this invention is to provide a means by which the position of the tubular pole may be adjusted with respect to the level or thickness of the ice. Accordingly, the present invention provides an ice fishing rig consisting, in substance, of a crossbar member adapted to extend over a hole formed in ice on a body of water. A tubular pole is supported on the crossbar member with one end of the tubular pole projected into the water and the other above the ice. The tubular pole contains a fluid having a freezing point below zero centigrade in which a float, preferably distinctively colored, is free to float. A fishing reel secured to one end of the tubular pole carries a magnet with a complimentary magnet secured to the float. When aligned, the magnetic components on the reel and on the float attract one another and secure the float to the one end of the tubular pole. When a fish strikes the line and the reel rotates, magnetic components are misaligned and the float is released to rise in the antifreeze fluid to the top thereby signaling a fish has struck the line.

DETAILED DESCRIPTION OF DRAWINGS

FIG. 1 is a perspective view of the ice fishing rig of the present invention positioned in an ice hole;

FIG. 4 is a detailed view of the reel of the ice fishing rig of the present invention; and FIG. 5 shows an alternate embodiment of the end braces of the present invention.

DETAILED DESCRIPTION OF INVENTION

Figure 2:
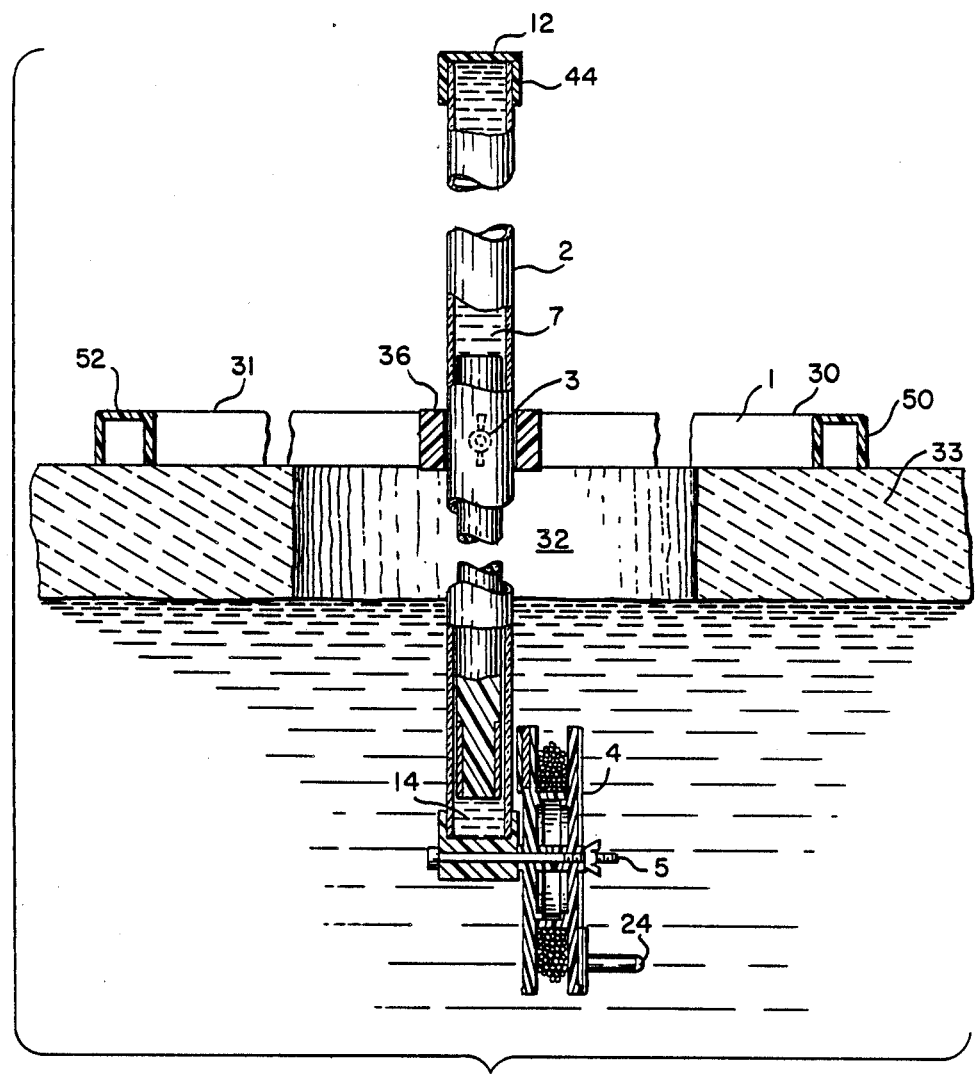
FIG. 2 is a cross sectional view of the ice fishing rig of the present invention.

The ice fishing rig generally shown in the drawings includes as its principle component a crossbar member or assembly 1 which is interengaged with a tubular pole 2 by pivoting means 3 which supports the tubular pole 2 for rotation in respect to the crossbar assembly 1. A fishing reel 4 is rotatably supported on its axis on one end of the tubular pole 2 by suitable means, such as an axle 5. A float 6 preferably colored is positioned within the tubular pole 2 and is free to float in a fluid 7 which has a freezing point below zero degrees centigrade, and preferably at least 20 to 30 degrees below zero centigrade. The reel 4 and float 6 each carry one of the components 9 and 10 forming a magnetic means. The components 9 and 10 are secured respectively to the inside of reel 4 and the side or bottom of float 6 in positions for mutual alignment with one another, so that when aligned and adjacent to one another the float 6 will remain secured at the one end of the transparent tubular pole 2, as illustrated in FIG. 2. Preferably, the component 10 is secured to the end of the float 6 so that inadvertent rotation of the float 6 within the tube 2 will not result in variations in the magnetic attraction between component 9 and 10. Alternately, inadvertent rotation of the float 6 within tubular pole 2 may be avoided by making the tubular pole other than circular in cross section with the float 2 having a corresponding configuration.

The tubular pole 2 is preferably made of a transparent plastic material. A typical configuration for the unit contemplates tubular pole 2 may be one inch to one and a half inches in diameter and having a length of two to four feet. The tube is sealed at one end 12 and at the other end 14 by suitable means which may comprise a plug or a heat sealed segment of the tube itself. Prior to sealing the tube the float 6 and the fluid 7 are positioned in the tube. The fluid 7 is preferably an antifreeze material with a freezing point sufficiently low as not to freeze during any normal usage conditions. Typically, the antifreeze should be fluid at temperatures of at least 20 to 50 degrees below zero centigrade. Conventional automotive antifreeze material may accordingly be used. The antifreeze however should not be opaque.

The float 6 may be formed of any suitable material which is not reactive with the antifreeze and will readily float in it. Thus, for example, a cellular foam plastic material may be utilized. The float 6 should be vividly colored for easy observation through the tubular pole 2. If desired, a luminescent paint may be applied to the surface of the float 6.

The magnetic means consisting of the magnets 9 and 10 may be conventionally formed of standard magnets with poles oriented to attract one another. In some instances for ease in orienting and securing the float more than one magnet component 9 may be used on the inner surface of the reel 4. As previously discussed, the magnet 10 is preferably secured to and across the bottom of float 6.

The reel 4 may comprise a conventional fish reel having an axle 5 that projects through the reel and rotatably supports it at end 14 of the tubular pole 2. The axle 5 may comprise a shaft locked by suitable means to the end 14 of the tubular pole 2 for easy rotation. The reel 4 contains a lenth of fish line 18 with appropriate gear at its end, including for example, a hook 20 and/or weight 21.

FIG. 4 shows a detailed view of the reel. The reel comprises a pair of parallel side walls 72 and 74, with each having a plurality of arcuate inwardly extending flanges 76. Each side wall further includes an axle-accepting flange 78 having a hole 79 therethrough for accepting the axle 5 when the reel is assembled. When assembled, flanges 76 on side wall 70 mate with flanges 76 on side wall 74 and the axle is inserted through hole 79. The reel 4 may be also be provided with a handle 24 for reeling in the line 18. Preferably the handle 24 should be relatively small so as not to prevent significant resistance to rotation when the reel is in the water. The magnet component 9 associated with the reel is positioned within a sleeve 70 disposed close to the periphery of the reel. As a result of the placement of the magnet component 9 close to the periphery of the reel, the magnet component 9 will move a greater distance from the magnet component 10 for a given rotation of the reel 4 than a magnet positioned closer to the axle 5. Therefore, a lesser rotation of the reel will release the float 6 than if the magnet was positioned closer to the center of the reel.

The crossbar assembly 1 is designed to support the tubular pole over a hole in the ice as illustrated in FIG. 1. As illustrated, the opposite ends 30 and 31 of the crossbar assembly 1 are supported over a hole 32 in the ice 33 with one end 12 of the tubular pole extending above the ice and the other end 14 of the tubular pole in the water. The means 3 supported the pole on the crossbar assembly preferably comprises a pivotable assembly which includes a block 36 having a hole shaped and sized to receive the pole 2, with the medial portion of the pole 2 snugly fitting through a hole 38 in the block 36. The pole 2 is secured against movement through the hole 38 by a set screw 40 which extends through the block 36 and contacts pole 2. The pole 2 may be adjusted in the hole 38 by loosening the set screw 40 and sliding the tube longitudinally in the hole 38 to a position in which desired lengths of the pole extend on either side of the block 36. In order to prevent inadvertent loss of the pole 2 from the rig in the event set screw 40 is not properly secured, the end 12 of the pole 2 may be formed with a plug 44 having a diameter greater than the diameter of the hole 38. In such event, the plug 44 must be inserted or secured after the pole 2 is assembled in the block 36, or alternately, the reel assembly 4 must be secured after the tube is secured in block 36.

The crossbar assembly 1 preferably comprises a pair of elongated rods 46 and 48 that extend parallel to one another on either side of the pole 2. These rods may be formed of any suitable material and are secured in fixed relation to one another at their ends 30 and 31 by end braces 50 and 52. The rods 46 and 48 and cross braces 50 and 52 may be formed of any suitable material. If desired and primarily for appearance reasons the end braces 50 and 52 may be made of the same material as tubular pole 2 but need not be filled with a fluid. Thus, for example, the crossbar assembly 1 and tube 2 may all be made of a polycarbonate tubing.

In a preferred embodiment, the cross-connectors 54 and 56 of end braces 50 and 52 may be offset from the ends of elongated rods 46 and 48 and further may be arcuately curved, with each end brace curved in opposite directions, as shown in FIG. 5 which illustrates an end view of end brace 50 The arcuate curve of end brace 52 is curved in the opposite direction. Thusly, the arcuate and offset braces 50 and 52 provide a recess that will permit the pole 2 to lie flat and coplanar with the rods 46 and 48 when the tubular pole 2 is pivoted into parallel alignment with the rods 46 and 48 for storage.

Figure 3:
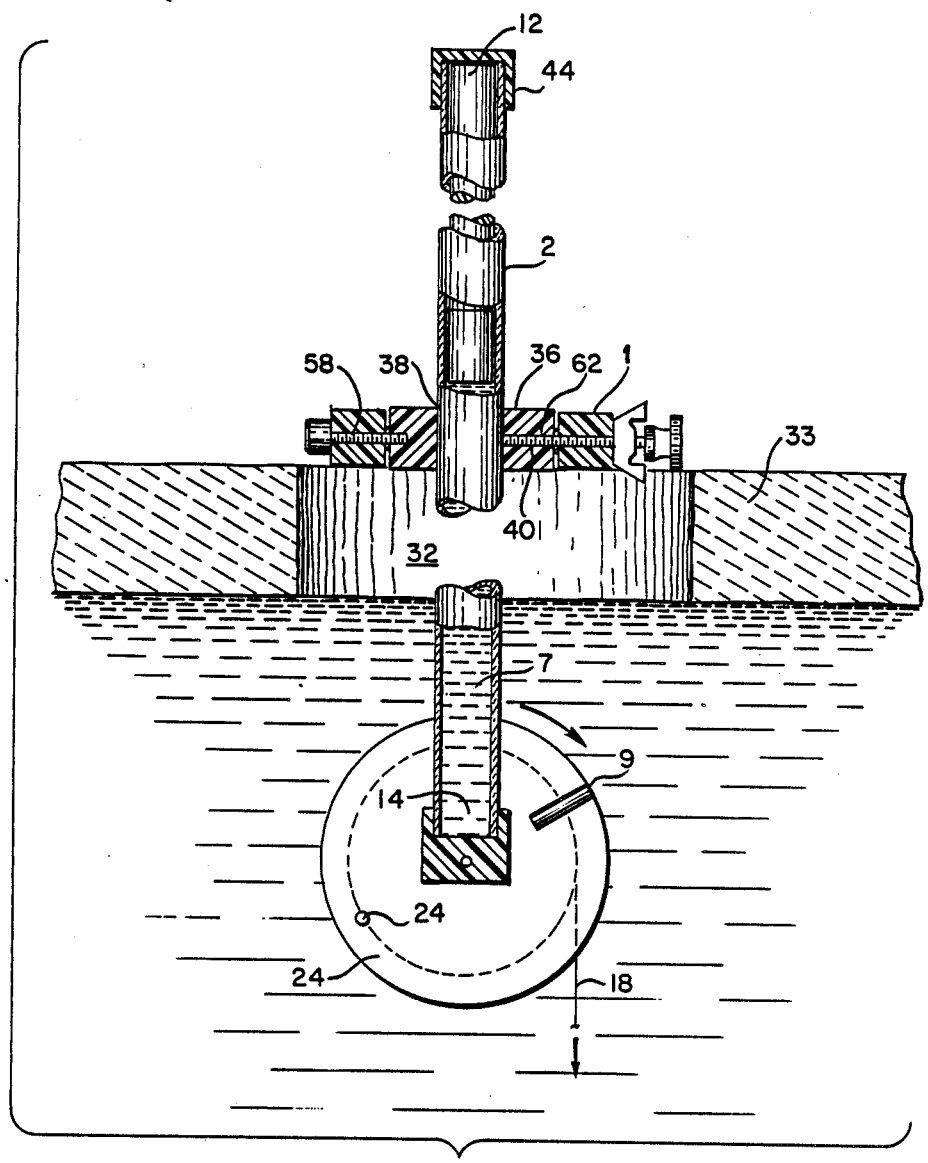
FIG. 3 is a side view of the ice fishing rig of the present invention.

The block 36 is secured for pivotable rotation between rods 46 and 48, preferably at the center of the crossbar assembly 1. A pair of pins 40 and 58 provide pivoting support for the block 36. As shown in FIG. 3, pin 40 extends completely through block 36 and also acts as the set screw. In alternate embodiments, a separate setting screw 40 may be included, in which case both pins would extend only partially through block 36 while the setting screw would extend completely through block 36 to contact pole 2 to hold it in place.

In use, a fisherman will ordinarily pivot the tubular pole 2 from storage position in which its parallel end coplanar with rods 46 and 48 to the position illustrated in FIG. 1. The reel 4 will be unwound a suitable length and the hook suitably baited. The float 6 will be positioned at the bottom or other end of tubular pole 2 with the magnetic components 9 and 10 aligned and attracting one another to secure the float 6 at the other end of the tubular pole 2. The crossbar assembly is positioned with the ends 30 and 31 supported on the ice 33 and the one end of the tubular pole visible above the ice. When a fish strikes the line 18 and causes the reel to move, the magnetic alignment of magnets 9 and 10 is disturbed and the float 6 rises in the tubular pole 2 to the one end 12. When the line is to be reset, the procedure described above is repeated.

Having now described my invention I claim:

1. An ice fishing rig comprising a crossbar adapted to extend over a hole formed in ice on a body of water, a tubular pole, means supporting the pole on the crossbar with one end adapted to project into the water and the other above the ice, the tubular pole closed at its ends and containing fluid, with at least a portion of the other end of said pole transparent, said fluid within said tubular pole having a freezing point below zero degrees centigrade, a float positioned within said tubular pole and floating in said fluid which float, unless restrained, will rise to the top of said tubular pole and be visible through the transparent portion of the pole, a reel for holding a length of fishing line, means axially supporting said reel at the one end of the pole, magnetic means having a pair of mutually attracting components with one magnetic component positioned on said float and the other magnetic component positioned on said reel in positions such that alignment of the components will restrain the float at the one end of the pole and when the components become non-aligned on rotation of the reel the float will rise in the tube.

2. An ice fishing rig as set forth in claim 1 wherein said means for supporting the pole in said crossbar include a pivot for rotating said crossbar to and from a position orthogonal with said pole.

3. An ice fishing rig as set forth in claim 2 wherein said crossbar comprises a pair of elongated parallel members with said pole positioned and secured therebetween by said pivot.

4. An ice fishing rig as set forth in claim 1 wherein one of said components is secured to the side of the reel adjacent the pole and the other component is secured to the end of the float closest to the one end.

5. An ice fishing rig as set forth in claim 4 wherein the float is colored for enhanced visibility through the transparent portion of the pole.

6. An ice fishing rig as set forth in claim 1 wherein said reel includes means integrally formed in said reel for securing at least one of said magnetic components.

7. An ice fishing rig as set forth in claim 6 wherein said integral means comprises a sleeve radially arranged on a face of said reel.

8. An ice fishing rig as set forth in claim 7 wherein said sleeve is positioned adjacent the edge of said face of said reel.

9. An ice fishing rig as set forth in claim 6 wherein said reel comprises a pair of parallel side wall with each having a plurality of arcuate inwardly extending flanges, said flanges of one side wall interlocking with the flanges of the other side wall to form a cylindrical base around which said fishing line may be wound.

10. An ice fishing rig as set forth in claim 3 further comprising a pair of end braces at opposite ends of said elongated parallel members, said end braces having cross-connectors which connect adjacent ends of said elongated parallel members.

11. An ice fishing rig as set forth in claim 10 wherein said cross connectors are arcuate in shape and offset from the ends of said elongated parallel members.

12. An ice fishing rig as set forth in claim 1 wherein said fluid is antifreeze.

* * * * *